US008806422B2

(12) United States Patent
Brunswig et al.

(10) Patent No.: US 8,806,422 B2
(45) Date of Patent: Aug. 12, 2014

(54) IMPACT ANALYSIS AND ADOPTION PLANNING BASED ON GLOBAL WHERE-USED LISTS

(75) Inventors: Frank Brunswig, Heidelberg (DE); Udo Klein, Maximiliansau (DE); Michael Meyringer, Rauenberg (DE); Tim Gaiser, Sinsheim (DE); Holger Handel, Mannheim (DE); Frank Renkes, Rauenberg (DE)

(73) Assignee: SAP AG, Walldorf (DE)

( * ) Notice: Subject to any disclaimer, the term of this patent is extended or adjusted under 35 U.S.C. 154(b) by 204 days.

(21) Appl. No.: 13/283,503

(22) Filed: Oct. 27, 2011

(65) Prior Publication Data

US 2013/0111427 A1    May 2, 2013

(51) Int. Cl.
*G06F 9/44*         (2006.01)

(52) U.S. Cl.
USPC .......................... 717/100; 717/101; 717/114

(58) Field of Classification Search
USPC ................. 717/100–102, 108, 114–116
IPC ................. G06F 17/303,17/30292, 17/30589, G06F 17/30607
See application file for complete search history.

(56) References Cited

U.S. PATENT DOCUMENTS

| 6,209,124 | B1 * | 3/2001 | Vermeire et al. ............. 717/114 |
| 6,601,234 | B1 * | 7/2003 | Bowman-Amuah .......... 717/108 |
| 7,165,239 | B2 * | 1/2007 | Hejlsberg et al. ............. 717/114 |
| 7,428,727 | B2 * | 9/2008 | Alverson et al. ............. 717/134 |
| 7,512,929 | B2 * | 3/2009 | Sangal et al. ................. 717/100 |
| 7,669,177 | B2 * | 2/2010 | Gerber et al. ................. 717/100 |
| 7,694,140 | B1 * | 4/2010 | Sachenko et al. ............. 713/170 |
| 7,800,613 | B2 * | 9/2010 | Hanrahan et al. ............. 345/440 |
| 7,971,180 | B2 * | 6/2011 | Kreamer et al. ............. 717/101 |
| 8,006,223 | B2 * | 8/2011 | Boulineau et al. ............. 717/101 |
| 8,069,437 | B2 * | 11/2011 | Aigner et al. ................. 717/109 |
| 8,140,367 | B2 * | 3/2012 | Bernardini et al. .......... 705/7.13 |
| 8,140,578 | B2 * | 3/2012 | Johnson et al. ............... 707/791 |
| 8,175,936 | B2 * | 5/2012 | Ronen et al. ................. 705/27.2 |
| 8,423,954 | B2 * | 4/2013 | Ronen et al. ................. 717/107 |
| 8,438,532 | B2 * | 5/2013 | Fox et al. ..................... 717/101 |

OTHER PUBLICATIONS

Santos-Neto et a, "Enabling Cross-Layer Optimizations in Storage Systems with Custom Metadata", ACM 213-216, 2008.*
Xu et al, "Metadata Driven Memory Optimizations in Dynamic Binary Translator", ACM, pp. 148-157, 2007.*
Tepfenhart et al, "A Product Focused, Layered Software Development Framework", ACM, pp. 473-475, 2002.*
Padilla et al, "Automatic Metadata Based Development", IEEE, 337-344, 2004.*

* cited by examiner

*Primary Examiner* — Anil Khatri
(74) *Attorney, Agent, or Firm* — Mintz Levin Cohn Ferris Glovsky and Popeo, P.C.

(57) ABSTRACT

Local dependency metadata can be collected from local metadata repositories of a plurality of development systems in a layered development system landscape, and a global where-used list that includes intra-layer and inter-layer dependencies between development entities in a layered development system landscape can be created, for example by aggregating the collected local dependency data. A usage metric quantifying how frequently each development entity is depended upon by other development entities in the layered development system landscape can be assigned to each development entity in the layered development system landscape. A measure of a relative effect of a change to one of the development entities on other development entities in the layered development system landscape can be promoted.

19 Claims, 4 Drawing Sheets

IMPACT ANALYSIS AND ADOPTION PLANNING BASED ON GLOBAL WHERE-USED LISTS

TECHNICAL FIELD

The subject matter described herein relates to maintaining consistency in a layered development environment, for example a layered development environment for a business software architecture.

BACKGROUND

A comprehensive development process for a business software architecture, such as for example an enterprise resource planning (ERP) system can be based on a concept of software layering. Multiple products or product versions having different lifecycles may be developed on the same application platform and basis technology. Layering may in some examples include one or more of a technology or development layer, which can be used by higher level components on a core component layer (e.g. a core software platform of an ERP system), and a networked application layer that includes software external to the core component layer that nonetheless relies upon the core component layer.

SUMMARY

In one aspect, a method includes collecting local dependency metadata from local metadata repositories of a plurality of development systems in a layered development system landscape. A global where-used list is created to include intra-layer and inter-layer dependencies between development entities in the layered development system landscape. The creation of this global where-used list includes aggregating the collected local dependency data. A usage metric quantifying how frequently each development entity is depended upon by other development entities in the layered development system landscape is assigned to each development entity in the layered development system landscape, and a measure of a relative effect of a change to one of the development entities on other development entities in the layered development system landscape is promoted.

In some variations one or more of the following can optionally be included. The measure can optionally include at least one of a ranked list of most affected and most affecting development entities structure elements in the layered development system landscape corresponding to the development entities in the ranked list; a visual depiction of relative impacts of changes to the development entities; and a generated notification for delivery to one or more of a developer, a manager, and a development organization. The generated notification can optionally include a description of an impact that a proposed change to one of the development entities will have on a pre-defined key performance indicator for the layered development system landscape. The usage metric can optionally include a number of direct and indirect usages of each development entity by other development entities in the layered development system landscape. The collecting can optionally include replicating the local dependency metadata to a global metadata repository, and the calculating can optionally further include reading the replicated local dependency metadata from the global metadata repository. The collecting can optionally include reading, at runtime, the local dependency metadata from the local metadata repositories, which are maintained in active system memory as part of a high performance in-memory database. The method can further optionally include identifying a first development entity having a larger usage metric than a second development entity as having a greater potential error impact associated with changes to the first development entity.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

Implementations of the current subject matter can provide one or more advantages. For example, impacts of changes to development entities within a development system on other development entities in other development systems within a layered development system landscape can be rapidly and automatically analyzed. The impacts are then available for immediate further analysis to determine whether a proposed change is likely to cause an unacceptable cascade of errors in development entities in the other development systems of the layered development system landscape.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
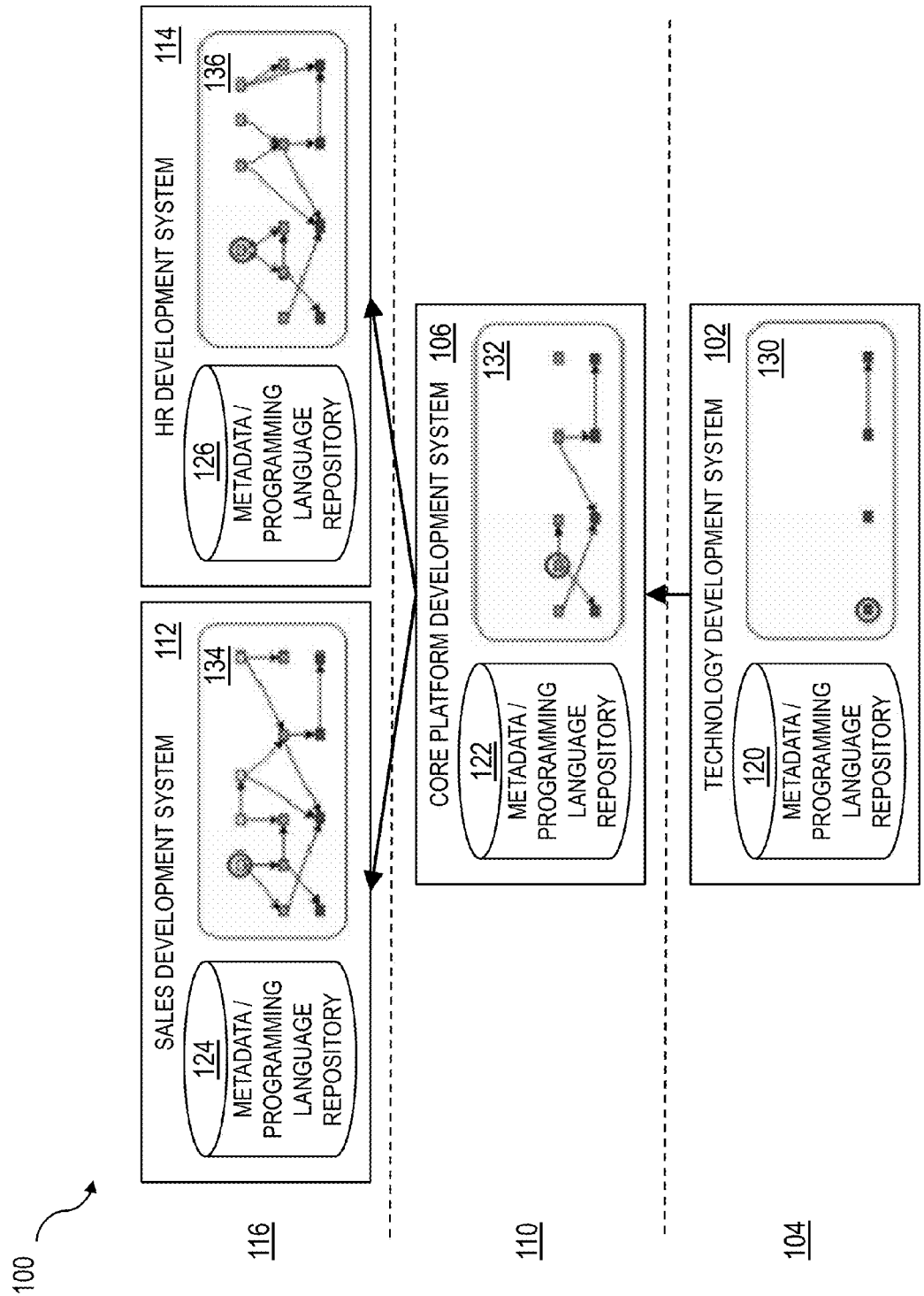
FIG. 1 shows a diagram illustrating software dependencies between data entities in a layered development system landscape.

FIG. 1 shows a dependency diagram illustrating an example of development entity dependencies in a layered development system landscape 100. The term development entity as used herein can refer to any data entity or component within a layered development system landscape, including but not limited to a data object or business object, a node or a root node of a data or business object, and the like. The term dependency, as used herein, can refer to any unidirectional relationship between development entities, in which a dependent development entity accesses data, metadata, data formats or structures, or the like from a depended upon development entity. As an example, a development entity such as a data object node, can be both a parent data object node and a child data object node in a web of inter-nodal dependencies and can depend on any number of child data object nodes and have any number of parent data object nodes that depend upon it. In a typical business software system, metadata can be distributed into meta-objects. A where-used list can ensure metadata consistency and to make dependencies between meta-object instances transparent. As used herein, the term "where-used data" refers to an index, listing, or the like that contains information pertaining to associations or dependencies between development entities for example data objects, nodes, or the like, of an object-based software solution.

In each layer of the layered development system landscape 100, dependencies of development entities of that layer to development entities of a lower layer (e.g. underlying content) can be generally well known. However, the dependencies of development entities in other development systems sharing same layer as a given development system or on a higher layer of the layered hierarchy on development entities within that given development system may be unknown. As shown in FIG. 1, the layered development system landscape 100 includes a technology development system 102 on a first level 104 of the layered development system landscape 100, a core platform development system 106 on a second level 110 of the layered development system landscape 100, and networked application development systems including a sales development system 112 and a human resources development system 114 on a third level 116 of the layered development system landscape 100. Each development system 102, 106, 112, 114 includes its own metadata/programming language repository 120, 122, 124, 126 that maintain metadata tracking sets of dependency relationships 130, 132, 134, 136 within the respective development system and to development systems at lower levels. The metadata/programming language repository can also include information relating to the programming language (e.g. ABAP, Java, etc.) used in the respective development system.

Because each development system lacks awareness of the dependencies of development entities at or above that development system's layer in the layered development system landscape 100 on development entities within that development system, it is impossible to accurately determine a list of development entities that will be affected by a change of a development entity in that development system. For example, while the technology development system 102 can maintain within its metadata/programming language repository 120 knowledge of a set of dependency relationships 130 within the technology development system 102, the metadata/programming language repository 120 lacks knowledge of dependencies of development entities in any of the core development system 106 or either of the networked application development systems 112, 114 on development entities within the technology development system 102. Accordingly, the result or impact of a change to a technology development entity in the technology development system 102 on other development entities (such as for example other development entities of the other development systems 106, 112, 114 in the layered development system landscape 100 cannot be calculated.

A where-used listing can be useful in resolving the typically one-way nature of inter-element dependencies between development entities. The data objects or data elements that depend upon data or data elements in a given development entity are usually not known to or stored within that given development entity. Currently available approaches to retaining a record of the web of inter-dependencies and associations that can arise in a complex object-based system is to hard-program an index of these dependencies, associations, or references. Such an approach can be effective in a static application environment. However, a development environment is by definition not static.

Without a comprehensive where-used list over the entire system landscape neither an impact analysis nor an adoption planning including effort estimation is possible without substantial manual effort to individually consider effects of a change on each of multiple application development systems. Furthermore, in a real software development system landscape, the dependency graphs of the various development systems can be much more complicated than shown in the example of FIG. 1. For example, the number of development entities can easily reach double-digit millions of entities. To address these and potentially other issues with currently available solutions, methods, systems, articles of manufacture, and the like consistent with one or more implementations of the current subject matter can, among other possible advantages, provide aggregation and visualization tools, which can optionally include drill-down capabilities for more detailed analysis of affected development entities so that only a necessary level of detail need be shown.

Figure 2:
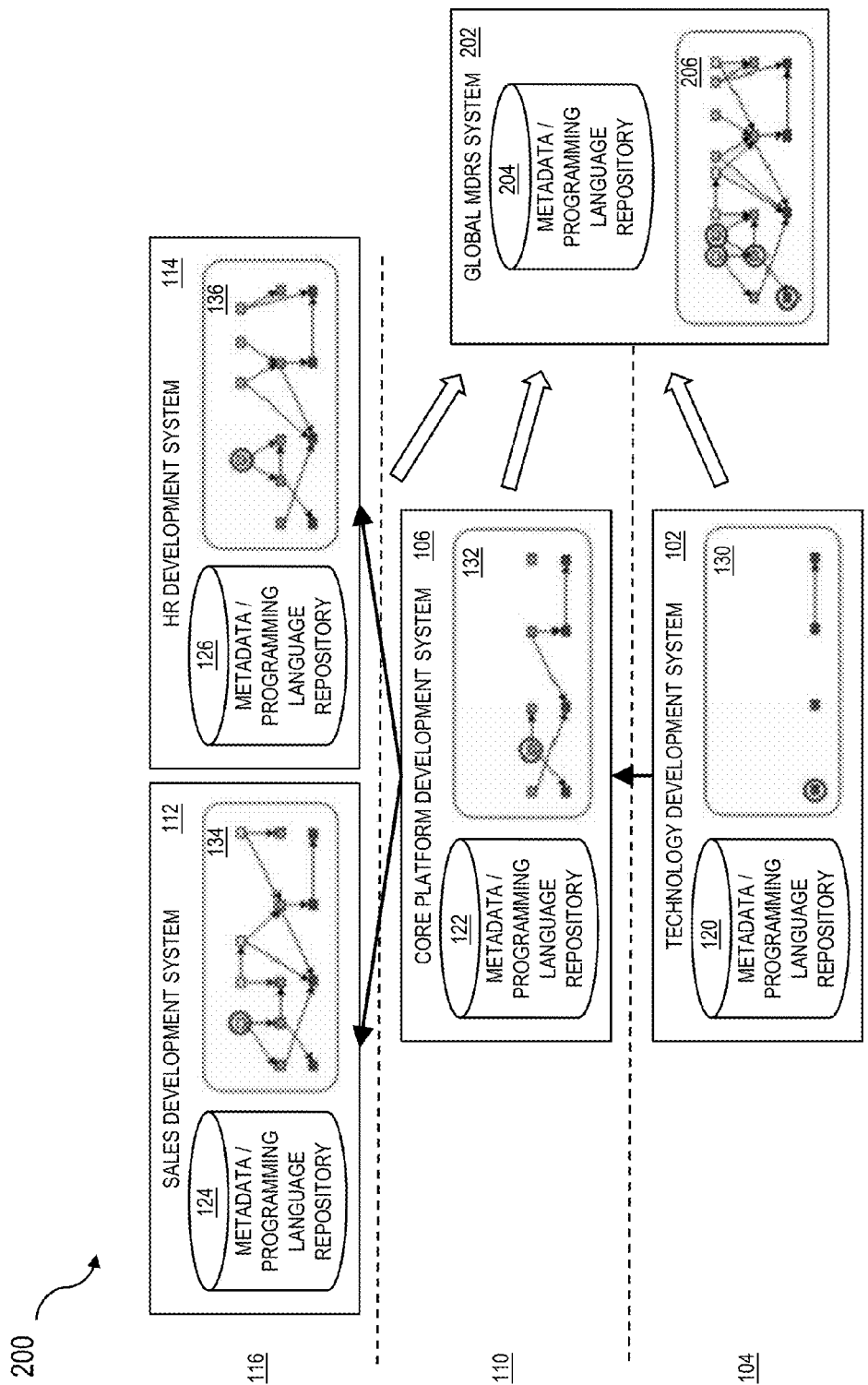
FIG. 2 shows a diagram illustrating software dependencies between data entities in a layered development system landscape incorporating global-where used list features consistent with implementations of the current subject matter.

FIG. 2 illustrates features consistent with implementations of the current subject matter in an adapted layered development system landscape 200. A global metadata repository system 202 can be provided to maintain a global metadata/programming repository 204 containing metadata supporting a global where-used list 206 to which the where-used list and index of each development system 102, 106, 112, 114 in the layered development system landscape 200 can be replicated. The global metadata/programming repository 204 can optionally contain only the metadata from the metadata/programming language repository 120, 122, 124, 126 at each development system 102, 106, 112, 114 and can be optimized to calculate a global where-used list of development entities in the layered development system landscape 200.

The global metadata repository system 202 can be implemented as a stand-alone system including one or more programmable processors that are connected either directly or over a communication network (e.g. a local area network, a wide area network, the Internet, multiple linked networks containing wired and/or wireless communication components, and the like) to the other development systems. Alternatively, two or more of the global metadata repository system 202 and the other development systems can be implemented on a single system including one or more programmable processors. The global metadata repository system 202 and one or more of the other development systems can optionally be hosted via virtual machines supported by one or more programmable processors.

In some implementations, an impact analyzer tool can be based on the central where-used list to provide information about directly and indirectly depending development entities having dependencies that might be affected by a change to any development entity at any layer of the layered development system landscape 200. The impact analyzer tool or similar software functionality can assign a number of direct and indirect usages as a property to each development entity in the layered development system landscape 200. A larger value of the usages property can indicate a larger likely impact in the event that a change to the corresponding development entity results in an error, such as for example an inadvertent breaking of dependencies of other development entities to the changed development entity. As development entities can typically be organized in software packages, an application component hierarchy and the responsible development organization can be derived upon detection of a potential error.

The number of usages of all development entities of a software package or even software packages can be aggregated. In addition, type identifiers of development entities can be used as filters, for example to quickly aggregate and/or calculate metrics such as the number of usages of all development entities of a specific type while excluding those of lesser interest (e.g. data types and user interface texts). A ranking can be generated based on the number of usages of each development entity in the to identify the most important development entities within the layered development system landscape 200. In addition, other filters may be possible, for example the date of a last change to a development entity.

Software packages and/or deployment units or process components can be used as structuring elements and can be visualized in a 3-dimensional tree map. The user interface of the impact analyzer tools can optionally include a 2-dimensional tree map for navigation and a 3-dimensional tree map to visualize the results. In this example, the 2-dimensional tree map can provide a visualization of structure elements like packages or process components while the 3-dimensional tree map can provide a visualization of the structure elements with a vertical axis illustrating the impact calculated by the aggregation of the number of usages of each development entity. Within the user interface of the tool it can be possible to collapse or expand the structure elements down to the leaves of the tree map. Selecting an element in the navigation tree map can trigger a recalculation of the impact. Alternatively, the navigation can be based on a classic tree control.

Figure 3:
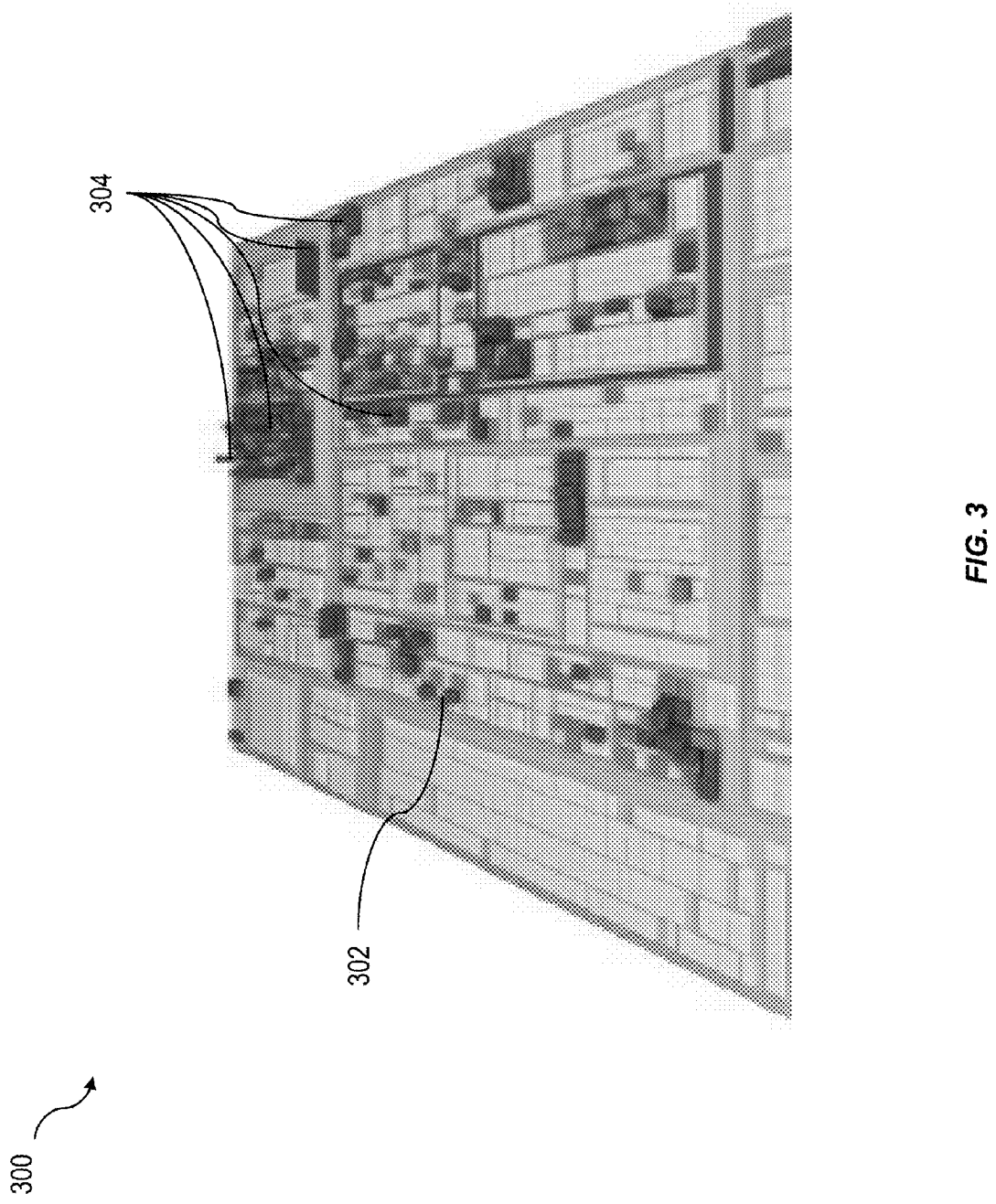
FIG. 3 shows a 3-dimensional tree map for use in visualizing an impact analysis consistent with implementations of the current subject matter.

FIG. 3 shows an illustrative example of a 3-dimensional tree map visualization 300 that can be used in conjunction with implementations of the current subject matter. Selecting a specific structure element 302 in the navigation tree can incorporate all development entities contained therein and can trigger a calculation of a corresponding dependencies graph. All depending development entities can be displayed in a same visual representation (e.g. color coding, shading, patterning, highlighting, etc.). The relative height of the similarly represented entities 304 in FIG. 3 can show an aggregated number of usages. In addition, the navigation can be filtered depending on the type of structure elements.

An impact analyzer tool consistent with implementations of the current subject matter can also provide ranked lists of most affected and most affecting development entities and corresponding structure elements. These lists can also be used for navigation. All relevant calculated information can also optionally be displayed in an impact report, for example using classic spreadsheet and table controls. The reporting can also be performed as a background task. One or more relevant notifications can optionally be triggered to inform the quality management and affected development organizations automatically depending on customizable key performance indicators, such as for example a maximum number of affected deployment units, process components, organizations, etc.

A global where-used list can optionally be stored in a high performance database, for example an in-memory database in which all of the individual where-used lists of the development systems are dynamically maintained in active memory such that the impact analyzer can perform aggregation and reporting tasks in real or near real time. In this manner, a rapid and dynamic analysis can be performed to provide an error message or other caution to a developer when a change to a development entity is requested.

In some implementations, a modified version of a development entity can be marked as including an incompatible change, for example if the impact analyzer determines that the change negatively affects too many other development entities in the layered development system landscape 200.

Based on dependency graphs (for example as shown in FIG. 3) or other correlation measures, the affected development entities including the corresponding development organizations and even the responsible developers can be determined. This information can provide a basis for an adoption planning approach. If high performance, in-memory database capabilities are used, adoption planning can be simulated in real time and therefore can be the decision maker tool for the operation team.

Figure 4:
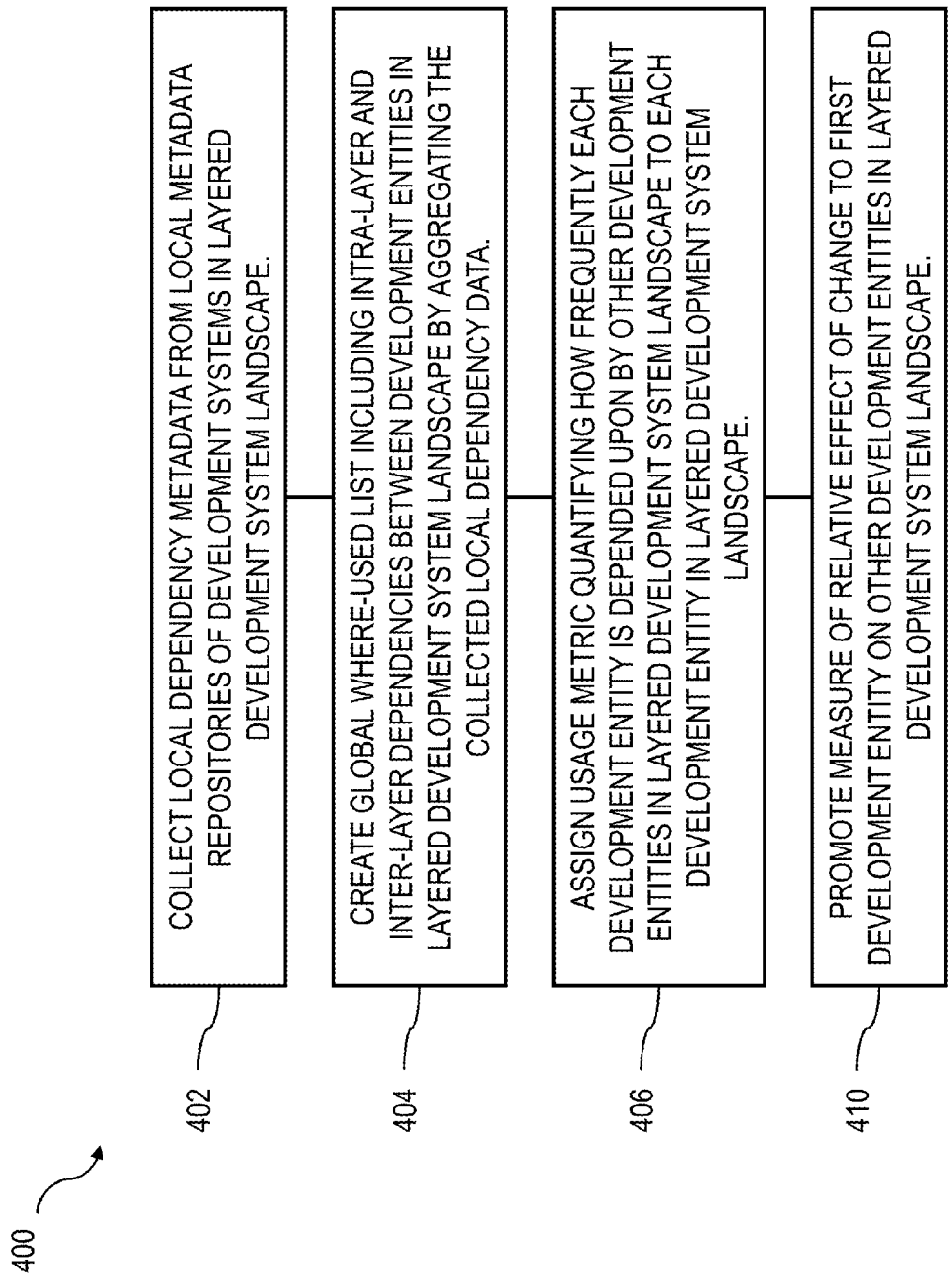
FIG. 4 is a process flow diagram illustrating aspects of a method having one or more features consistent with implementations of the current subject matter.

FIG. 4 shows a process flow chart illustrating a method having one or more features consistent with implementations of the current subject matter. At 402, local dependency metadata are collected from local metadata repositories of a plurality of development systems in a layered development system landscape. The collecting can optionally include one or more of replicating the local dependency metadata to a global metadata repository, and the calculating further comprises reading the replicated local dependency metadata from the global metadata repository and reading, at runtime, the local dependency metadata from the local metadata repositories which are maintained in active system memory as part of a high performance in-memory database. At 404, a global where-used list that includes intra-layer and inter-layer dependencies between development entities in the layered development system landscape, is created, for example by aggregating the collected local dependency data. A usage metric is assigned to each development entity in the layered development system landscape at 406. The usage metric quantifies how frequently each development entity is depended upon by other development entities in the layered development system landscape.

At 410, a measure of a relative effect of a change to one of the development entities on other development entities in the layered development system landscape is promoted. The promoted measure can optionally include one or more of a ranked list of most affected and most affecting development entities structure elements in the layered development system landscape corresponding to the development entities in the ranked list; a visual depiction of relative impacts of changes to the development entities; and a generated notification for delivery to one or more of a developer, a manager, and a development organization. Such a notification can include a description of an impact that a proposed change to one of the development entities will have on a pre-defined key performance indicator for the layered development system landscape.

Additional optional features can include, but are not limited to, identifying a first development entity having a larger usage metric than a second development entity as having a greater potential error impact associated with changes to the first development entity. A usage metric can include a number of direct and indirect usages of each development entity by other development entities in the layered development system landscape.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
    collecting local dependency metadata from local metadata repositories of a plurality of development entities in a layered development system landscape;
    creating a global where-used list comprising intra-layer and inter-layer dependencies between development entities of the plurality of development entities, the creating comprising aggregating the local dependency metadata;
    assigning a usage metric to each development entity of the plurality of development entities, the usage metric being optimized to calculate a global where-used list and adapted to quantify, based on the global where-used list, how frequently each development entity is depended upon by other development entities in the plurality of development entities; and
    processing a measure of a relative effect of a change to one of the development entities on other development entities in the plurality of development entities, based on the usage metric for each development entity.

2. A computer program product as in claim 1, wherein the measure comprises at least one of a ranked list of most affected and most affecting development entities structure elements in the layered development system landscape corresponding to the development entities in the ranked list; a visual depiction of relative impacts of changes to the development entities; and a generated notification for delivery to one or more of a developer, a manager, and a development organization, the notification including a description of an impact that a proposed change to one of the development entities will have on a pre-defined key performance indicator for the layered development system landscape.

3. A computer program product as in claim 1, wherein the processing of the measure further comprises identifying a first development entity having a larger usage metric than a second development entity as having a greater potential error impact associated with changes to the first development entity.

4. A computer program product as in claim 1, wherein the usage metric comprises a number of direct and indirect usages of each development entity by other development entities in the layered development system landscape.

5. A computer program product as in claim 1, wherein the collecting comprises replicating the local dependency metadata to a global metadata repository, and the calculating further comprises reading the replicated local dependency metadata from the global metadata repository.

6. A computer program product as in claim 1, wherein the collecting comprises reading, at runtime, the local dependency metadata from the local metadata repositories, which are maintained in active system memory as part of a high performance in-memory database.

7. A system comprising:
    at least one programmable processor; and
    a machine-readable medium storing instructions that, when executed by the at least one programmable processor, cause the at least one programmable processor to perform operations comprising:

collecting local dependency metadata from local metadata repositories of a plurality of development entities in a layered development system landscape;

creating a global where-used list comprising intra-layer and inter-layer dependencies between development entities of the plurality of development entities, the creating comprising aggregating the local dependency metadata;

assigning a usage metric to each development entity of the plurality of development entities, the usage metric being optimized to calculate a global where-used list and adapted to quantify, based on the global where-used list, how frequently each development entity is depended upon by other development entities in the plurality of development entities; and processing a measure of a relative effect of a change to one of the development entities on other development entities in the plurality of development entities, based on the usage metric for each development entity.

8. A system as in claim 7, wherein the measure comprises at least one of a ranked list of most affected and most affecting development entities structure elements in the layered development system landscape corresponding to the development entities in the ranked list; a visual depiction of relative impacts of changes to the development entities; and a generated notification for delivery to one or more of a developer, a manager, and a development organization, the notification including a description of an impact that a proposed change to one of the development entities will have on a pre-defined key performance indicator for the layered development system landscape.

9. A system as in claim 7, wherein the processing of the measure further comprises identifying a first development entity having a larger usage metric than a second development entity as having a greater potential error impact associated with changes to the first development entity.

10. A system as in claim 7, wherein the usage metric comprises a number of direct and indirect usages of each development entity by other development entities in the layered development system landscape.

11. A system as in claim 7, wherein the collecting comprises replicating the local dependency metadata to a global metadata repository, and the calculating further comprises reading the replicated local dependency metadata from the global metadata repository.

12. A system as in claim 7, wherein the collecting comprises reading, at runtime, the local dependency metadata from the local metadata repositories, which are maintained in active system memory as part of a high performance in-memory database.

13. A computer implemented method comprising:
collecting local dependency metadata from local metadata repositories of a plurality of development entities in a layered development system landscape;

creating a global where-used list comprising intra-layer and inter-layer dependencies between development entities of the plurality of development entities, the creating comprising aggregating the local dependency metadata;

assigning a usage metric to each development entity of the plurality of development entities, the usage metric being optimized to calculate a global where-used list and adapted to quantify, based on the global where-used list, how frequently each development entity is depended upon by other development entities in the plurality of development entities; and processing a measure of a relative effect of a change to one of the development entities on other development entities in the plurality of development entities, based on the usage metric for each development entity;

wherein the collecting, creating, assigning and processing are performed by at least one system comprising computer hardware.

14. A computer implemented method as in claim 13, wherein the measure comprises at least one of a ranked list of most affected and most affecting development entities structure elements in the layered development system landscape corresponding to the development entities in the ranked list; a visual depiction of relative impacts of changes to the development entities; and a generated notification for delivery to one or more of a developer, a manager, and a development organization, the notification including a description of an impact that a proposed change to one of the development entities will have on a pre-defined key performance indicator for the layered development system landscape.

15. A computer implemented method as in claim 13, further comprising identifying a first development entity having a larger usage metric than a second development entity as having a greater potential error impact associated with changes to the first development entity.

16. A computer implemented method as in claim 13, wherein the usage metric comprises a number of direct and indirect usages of each development entity by other development entities in the layered development system landscape.

17. A computer implemented method as in claim 13, wherein the collecting comprises replicating the local dependency metadata to a global metadata repository, and the calculating further comprises reading the replicated local dependency metadata from the global metadata repository.

18. A computer implemented method as in claim 13, wherein the collecting comprises reading, at runtime, the local dependency metadata from the local metadata repositories, which are maintained in active system memory as part of a high performance in-memory database.

19. A computer implemented method as in claim 13, wherein at least one of the collecting, the creating, the assigning, and the promoting are performed by at least one programmable processor.

* * * * *